United States Patent [19]

Yamakawa et al.

[11] Patent Number: 4,617,840

[45] Date of Patent: Oct. 21, 1986

[54] SYSTEM FOR CONTROLLING A POWER TRANSMISSION OF A FOUR-WHEEL DRIVE VEHICLE

[75] Inventors: Toru Yamakawa; Fujio Makita, both of Hachioji; Mitsuo Umezawa; Ryuzo Sakakiyama, both of Tokyo, all of Japan

[73] Assignee: Fuji Jukogyo Kabushiki Kaisha, Tokyo, Japan

[21] Appl. No.: 561,717

[22] Filed: Dec. 15, 1983

[30] Foreign Application Priority Data

Dec. 15, 1982 [JP] Japan ................ 57-219630

[51] Int. Cl.⁴ .......................................... B60K 41/02
[52] U.S. Cl. ...................................... 74/865; 74/861; 74/665 G; 180/247
[58] Field of Search ............ 180/233, 247; 74/665 G, 74/665 GA, 665 T, 861, 865, 866, 710.5; 364/426, 431.07

[56] References Cited

U.S. PATENT DOCUMENTS

| | | | |
|---|---|---|---|
| 4,132,297 | 1/1979 | Brown et al. | 74/665 G X |
| 4,298,085 | 11/1981 | Moroto et al. | 180/247 |
| 4,367,661 | 1/1983 | Moroto et al. | 74/665 G X |
| 4,369,671 | 1/1983 | Matsumoto et al. | 180/247 X |
| 4,407,387 | 10/1983 | Lindbert | 180/247 |
| 4,433,748 | 2/1984 | Satoh et al. | 180/247 |
| 4,444,073 | 4/1984 | Moroto et al. | 74/665 G |
| 4,458,557 | 7/1984 | Hayakawa | 180/247 X |
| 4,466,502 | 8/1984 | Sakai | 180/247 |
| 4,466,519 | 8/1984 | Römer | 180/244 X |

FOREIGN PATENT DOCUMENTS 2065244 6/1981 United Kingdom ............. 180/247

*Primary Examiner*—William F. Pate, III
*Assistant Examiner*—Dwight G. Diehl
*Attorney, Agent, or Firm*—Martin A. Farber

[57] ABSTRACT

A system for controlling power transmission of a four-wheel drive vehicle powered by an engine. The vehicle is provided with a transmission for transmitting a power of the engine to main wheels and a clutch for selectively transmitting the power to auxiliary wheels. In order to detect sudden braking of the vehicle, a vehicle speed sensor and a control circuit for detecting deceleration of the vehicle greater than a predetermined value are provided, the control circuit producing an output signal. A switch is provided responsive to the output signal for engaging the clutch, whereby the four-wheel driving power transmission is established.

11 Claims, 5 Drawing Figures

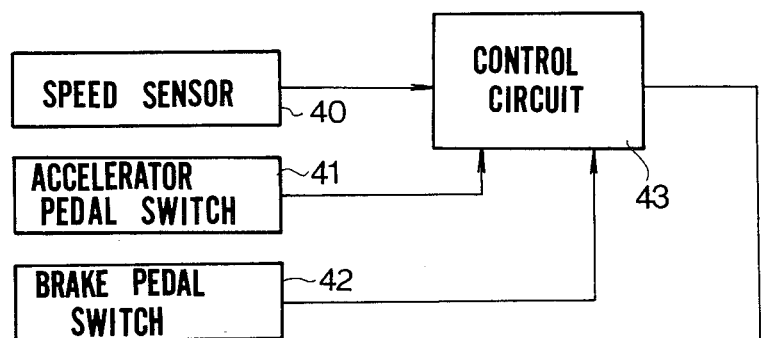
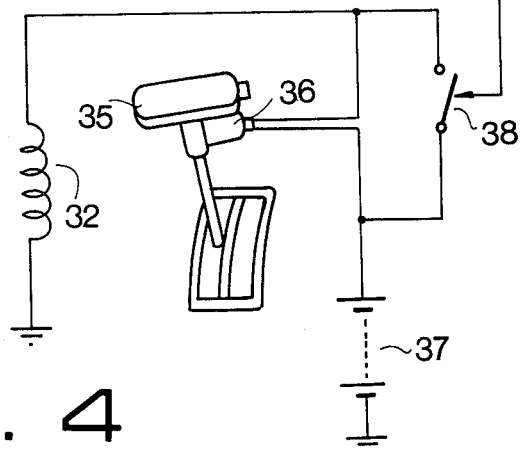
FIG. 2
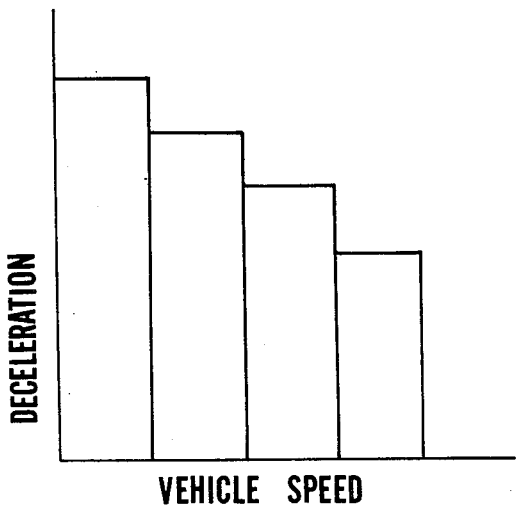
FIG. 4

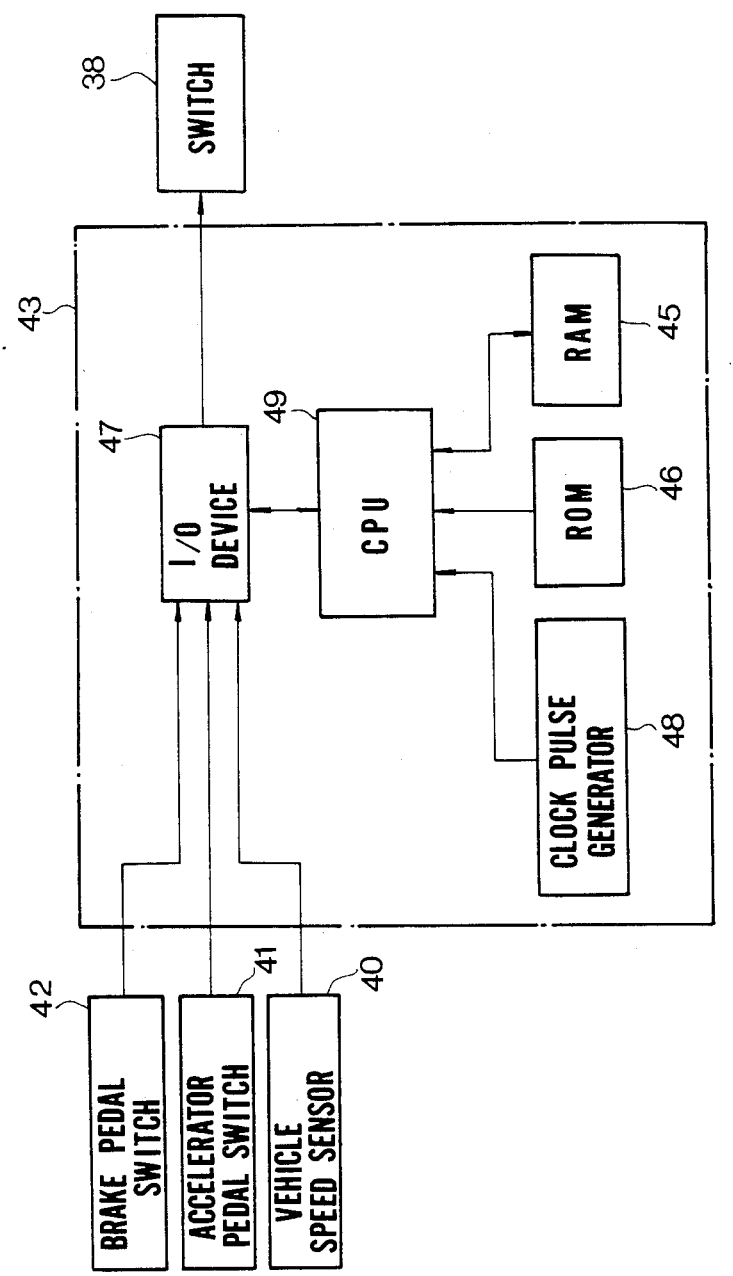

SYSTEM FOR CONTROLLING A POWER TRANSMISSION OF A FOUR-WHEEL DRIVE VEHICLE

BACKGROUND OF THE INVENTION

The present invention relates to a system for a four-wheel drive vehicle for automatically changing the transmission system of the vehicle from two-wheel drive to four-wheel drive when the vehicle is rapidly decelerated.

In a conventional four-wheel drive vehicle, a power transmission system for two-wheel driving is selectively converted to four-wheel driving system by engaging a clutch which is manually operated by a select lever.

It is desirable for the transmission system automatically change from two-wheel drive to the four-wheel drive system under particular driving conditions such as driving on a slippery, icy or snowy road, or sudden braking, in order to prevent skidding or slipping of the wheels.

SUMMARY OF THE INVENTION

The object of the present invention is to provide a system for automatically changing from two-wheel drive to four-wheel drive sudden braking. In accordance with the present invention, the sudden braking is detected by deceleration. Considering the deceleration of the vehicle, it will be understood that the deceleration decreases with an increase of the vehicle speed, if the brake pedal depression force is constant. Therefore, in an embodiment of the present invention, the deceleration representing the sudden braking is varied with the vehicle speed.

According to the present invention, there is provided a system for controlling power transmission of a four-wheel drive vehicle powered by an engine comprising: a transmission for transmitting power of said engine to main wheels; a clutch for selectively transmitting said power to auxiliary wheels; first sensing means for sensing the speed of the vehicle and for producing a signal dependent on the speed; means responsive to the signal from said first sensing means for detecting deceleration of said vehicle and for producing an output signal when the deceleration exceeds a predetermined value; and switch means responsive to said output signal for engaging said clutch, whereby the four-wheel driving power transmission is established.

The present invention will be more apparent from the following description made with reference to the accompanying drawings.

BRIEF DESCRIPTION OF DRAWINGS

FIG. 2 is a block diagram of a control system of the present invention;

FIG. 3 is a block diagram showing an example of a control circuit of FIG. 2;

FIG. 4 is a graph showing a relationship between deceleration of a vehicle and the speed of the vehicle.

DETAILED DESCRIPTION OF THE PREFERRED EMBODIMENTS

Figure 1:
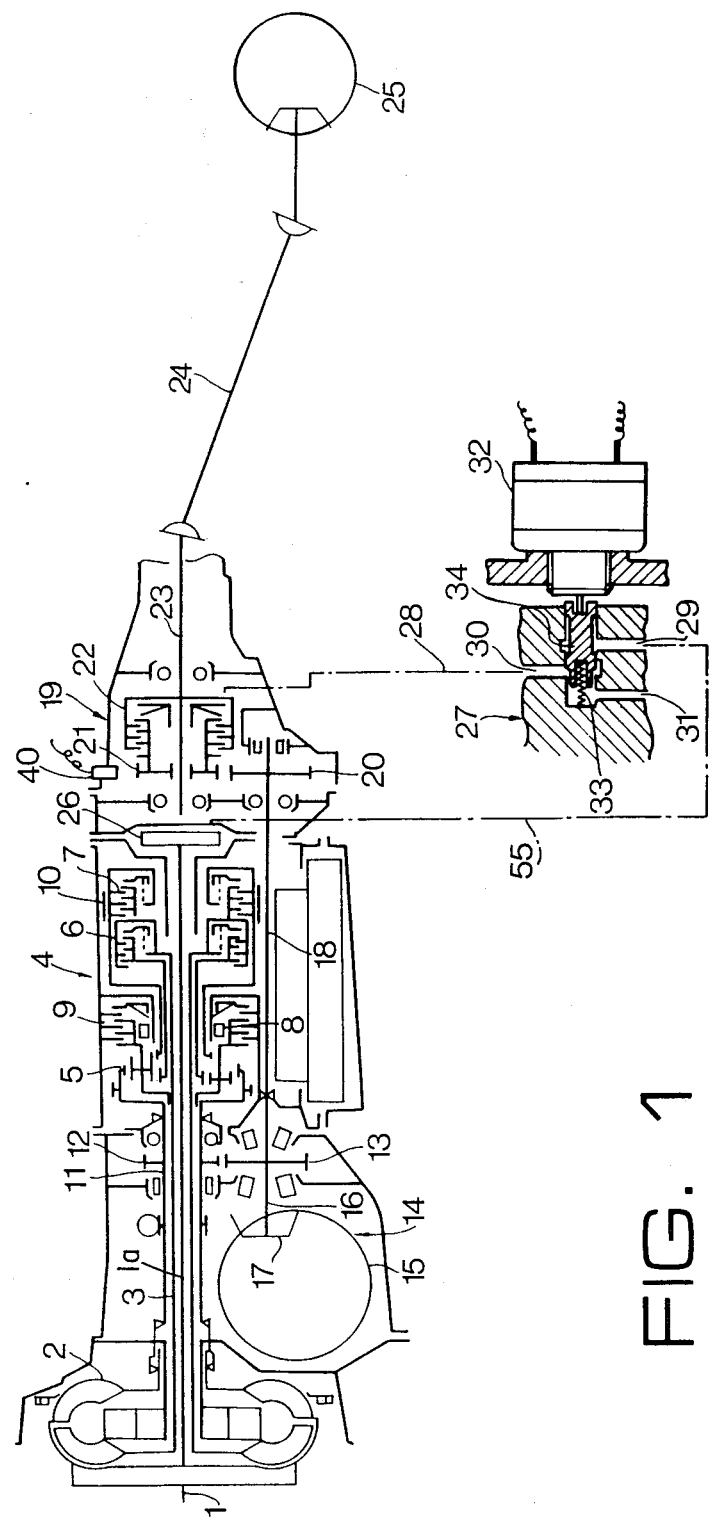
FIG. 1 is a schematic view showing a transmission system in which the present invention is applied.

Referring to FIG. 1, a crankshaft 1 of an engine (not shown) mounted on a vehicle is operatively connected to a turbine shaft 3 through a torque converter 2. The turbine shaft 3 is operatively connected to an automatic transmission device 4.

The automatic transmission device 4 comprises a planetary gear 5, clutches 6 and 7, a one-way clutch 8, a brake 9, and a brake band 10.

The output of the automatic transmission device is transmitted to an output shaft 11 on which a gear 12 is securely mounted and which in turn engages with a gear 13. The gear 13 is integral with a shaft 16 of a drive pinion 17 which engages with a crown gear 15 of a final reduction device 14 for front wheels (not shown) of the vehicle. The shaft 16 is connected to a transfer drive shaft 18 which extends rearwardly and is connected to a first transfer gear 20 of a transfer device 19. The first transfer gear 20 is operatively connected to a hydraulic clutch 22 through a second transfer gear 21. The hydraulic clutch 22 is adapted to be engaged by pressure oil supplied by an oil pump 26. The driven member of the hydraulic clutch 22 is operatively connected to a final reduction device 25 for rear wheels (not shown) of the vehicles through a rear drive shaft 23 and a propeller shaft 24.

A pressure oil control system has an electromagnetic changeover valve 27. The valve 27 comprises a spool 34 connected to a rod of a solenoid 32, a spring 33 to bias the spool to the right, an inlet port 29, an outlet port 30, and a drain port 31. The inlet port 29 is communicated with the oil pump 26 in the automatic transmission device 4 through a passage 55 and the outlet port 30 is communicated with the hydraulic clutch 22 by a passage 28 for the engagement of the clutch. The oil pump 26 is connected to a drive member of the torque converter 2 by an oil pump driving shaft 1a extending in the turbine shaft 3.

In the de-energized state of the solenoid 32, which is the illustrated state, the inlet port 29 is closed and the outlet port 30 is communicated with the drain port 31. Thus, the hydrualic clutch 22 is disengaged. When the solenoid 32 is energized, the spool 34 is shifted to the left, so that the drain port 31 is closed and the inlet port 29 is communicated with the outlet port 30 to engage the hydraulic clutch 22, thereby establishing the four-wheel drive.

Referring to FIG. 2, a manual switch 36 is mounted on a select lever 35 of the automatic transmission device 4 and electrically connected in series between the solenoid 32 and a battery 37 in series. Further, an electrically operated switch 38 is connected to the manual switch 36 in parallel. Thus, the solenoid 32 is energized by closing the switch 36 or 38 to establish the four-wheel drive.

In order to sense driving conditions of the vehicle, a vehicle speed sensor 40, accelerator pedal switch 41 and brake pedal switch 42 are provided. The sensor 40 produces output pulses dependent on vehicle speed. Output signals of this sensor and switches are applied to a control circuit 43. The control circuit 43 determines the deceleration from the output of the vehicle speed sensor 40. When the deceleration exceeds a predetermined value, the control circuit 43 produces an output signal which is applied to the switch 38 to close it. Thus, the two-wheel drive is automatically changed to the four-wheel drive.

When the brake pedal is released and the accelerator pedal is depressed, the accelerator pedal switch 41 is closed and the brake pedal switch 42 is opened, and when the vehicle speed is zero, the output signal of the control circuit 43 disappears. Thus, the drive system returns to the two-wheel drive.

Referring to FIG. 3, the control circuit 43 is provided with an I/O device 47 for reading input data and operating the switch 38, a RAM 45 for storing calculating results, a ROM 46 storing programs and reference values for detecting sudden braking, a clock pulse generator 48, and a central processing unit (CPU) 49 for performing a program.

As shown in FIG. 4, the deceleration decreases with an increase of vehicle speed under the condition of the same depression force on the brake pedal. Therefore, the reference values stored in the ROM 46 for detecting sudden braking are selected to meet the variation of FIG. 4. That is the control system is so arranged to close the switch 38 at a deceleration which decreases as the vehicle speed increases.

Figure 5:
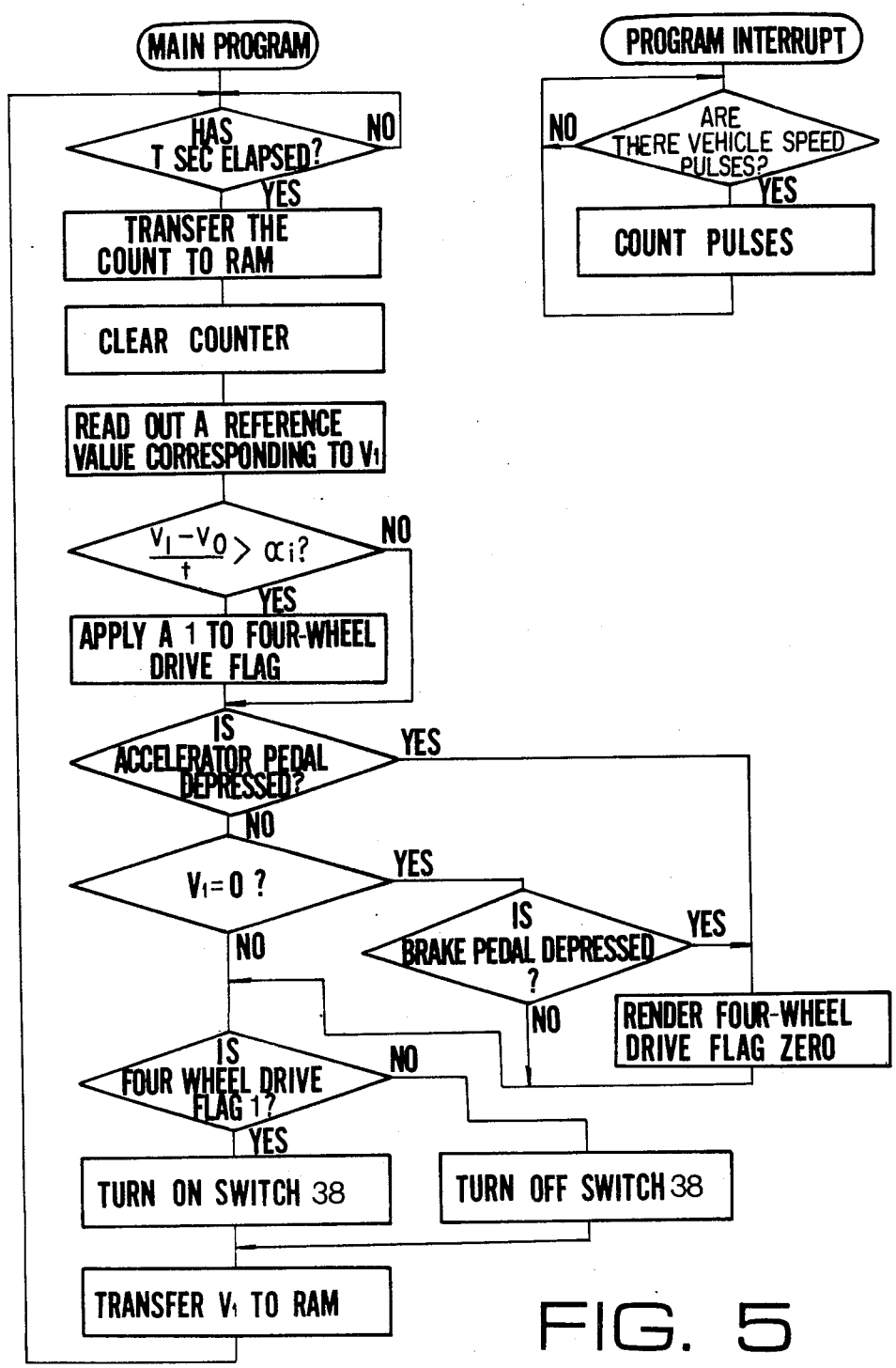
FIG. 5 shows a flow-chart.

Explaining the operation of the system with reference to FIG. 5 showing a flow chart, the program comprises a main program and a program interrupt for counting pulses from the vehicle speed sensor 40. When a predetermined time (t sec) elapse, the vehicle speed $V_1$ dependent on the count of a counter (not shown) is stored in the RAM 45. A reference value $\alpha i$ corresponding to the speed $V_1$ is read and a judgement is made whether the deceleration $(V_1-V_o)/t$ (where $V_o$ is previous speed) is greater than the reference value $\alpha i$. When the deceleration is greater than the reference value $\alpha i$, a 1 is applied to a flag for four-wheel drive. When the accelerator pedal is not depressed and the vehicle speed $V_1$ is not zero, and when the four-wheel drive flag is 1, the switch 38 is turned on. Thus, the four-wheel drive is established. When the accelerator pedal is depressed and the brake pedal is released, the four-wheel drive flag becomes zero. Accordingly, the switch 38 is turned off, thereby providing the two-wheel drive. The speed $V_1$ is stored in the RAM 45 for the subsequent program after t seconds.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A system for controlling power transmission of a four-wheel drive vehicle powered by an engine comprising:
   a transmission for transmitting power of said engine to main wheels of the vehicle;
   a clutch for selectively transmitting said power to auxiliary wheels of the vehicle;
   first sensing means for sensing the speed of the vehicle and for producing a signal dependent of the speed;
   means responsive to the signal from said first sensing means for detecting the deceleration of said vehicle and for producing an output signal when the deceleration exceeds a predetermined value; and
   switch means responsive to said output signal for engaging said clutch, whereby the four-wheel driving power transmission is established.

2. The system according to claim 1 wherein said clutch is a hydraulic clutch.

3. The system according to claim 1, wherein
   said means responsive to the signal from said first sensing means is an electric means and said output signal is an electric output signal and wherein the signal from said first sensing means is an electric signal.

4. The system according to claim 1, wherein
   said predetermined value decreases with an increase of vehicle speed.

5. A system for controlling power transmission of a four-wheel drive vehicle powered by an engine comprising:
   a transmission for transmitting the power of said engine to main wheels of the vehicle;
   a clutch for selectively transmitting said power to auxiliary wheels of the vehicle;
   first sensing means for sensing tne speed of said vehicle and for producing a signal dependent on the speed;
   first means responsive to said signal from said first sensing means for producing a signal dependent on the variation of the vehicle speed;
   second means responsive to said signal from said first means for producing a signal dependent on deceleration of the vehicle exceeding a predetermined deceleration;
   switch means responsive to said signal from said second means for engaging said clutch.

6. The system according to claim 5 wherein said second means includes means for comparing the signal from said first means with a reference value.

7. The system according to claim 6 wherein said reference value decreases with an increase of vehicle speed.

8. A system for controlling power transmission of a four-wheel drive vehicle powered by an engine comprising:
   a transmission for transmitting power of said engine to main wheels of the vehicle;
   a clutch for selectively transmitting said power to auxiliary wheels of the vehicle;
   means for engaging said clutch such that four-wheel driving power transmission is established during deceleration of the vehicle but only when the deceleration exceeds a predetermined value.

9. The system according to claim 8, wherein
   said predetermined value decreases with an increase of vehicle speed.

10. The system according to claim 8, wherein
    means for disengaging said clutch such that two-wheel driving power transmission is established to the main wheels when a brake pedal of the vehicle is released and an accelerator pedal of the vehicle is depressed.

11. The system according to claim 8, wherein
    means for disengaging said clutch such that two-wheel driving power transmission is established to the main wheels when vehicle speed is zero.

* * * * *